(12) United States Patent
Bridges et al.

(10) Patent No.: US 9,113,154 B2
(45) Date of Patent: Aug. 18, 2015

(54) THREE-DIMENSIONAL MEASUREMENT DEVICE HAVING THREE-DIMENSIONAL OVERVIEW CAMERA

(71) Applicant: FARO Technologies, Inc., Lake Mary, FL (US)

(72) Inventors: Robert E. Bridges, Kennett Square, PA (US); David H. Parker, Earlysville, VA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 14/327,042

(22) Filed: Jul. 9, 2014

(65) Prior Publication Data

US 2015/0015895 A1  Jan. 15, 2015

Related U.S. Application Data

(60) Provisional application No. 61/844,631, filed on Jul. 10, 2013.

(51) Int. Cl.
*G01N 21/00* (2006.01)
*H04N 13/02* (2006.01)
(Continued)

(52) U.S. Cl.
CPC .......... *H04N 13/0221* (2013.01); *G01B 11/002* (2013.01); *G01B 11/026* (2013.01); *G01B 11/14* (2013.01); *G01C 3/08* (2013.01); *G01C 15/002* (2013.01); *G01S 7/4817* (2013.01); *G01S 17/42* (2013.01); *G01S 17/66* (2013.01); *G01S 17/87* (2013.01); *G01S 17/89* (2013.01); *G06F 3/017* (2013.01)

(58) Field of Classification Search
USPC .............................. 356/300–445, 72–73, 614
See application file for complete search history.

(56) References Cited

U.S. PATENT DOCUMENTS 8,331,624 B2  12/2012  Braunecker et al.
2006/0193521 A1  8/2006  England et al.
(Continued)

FOREIGN PATENT DOCUMENTS

DE  202006020299 U1  4/2008
WO  2013029673 A1  3/2013
(Continued)

OTHER PUBLICATIONS

Notification of Transmittal of the International Search Report and the Written Opinion of the International Searching Authority, or the Declaration; PCT/US2014/046073; Nov. 24, 2014.

*Primary Examiner* — Abdullahi Nur
(74) *Attorney, Agent, or Firm* — Cantor Colburn LLP

(57) ABSTRACT

A device for optically scanning and measuring an environment is provided. The device includes a first measurement device that emits a light beam in a direction to measure a distance to a remote target based at least in part on light reflected by the remote target. A three-dimensional camera coupled to a periphery of the first measurement device is configured to record an image of an object. A processor is operably coupled to the first measurement device and three-dimensional camera and is responsive to determine the three-dimensional coordinates of the measurement point based at least in part on the angles of rotation of the device and the distance. The processor further being responsive to determine the three-dimensional coordinates of a plurality of points on the object based at least in part on the angles of rotation of the device and the image.

20 Claims, 7 Drawing Sheets

(51) Int. Cl.

| | |
|---|---|
| *G01B 11/14* | (2006.01) |
| *G01C 3/08* | (2006.01) |
| *G01C 15/00* | (2006.01) |
| *G01S 17/66* | (2006.01) |
| *G01S 17/87* | (2006.01) |
| *G01B 11/00* | (2006.01) |
| *G06F 3/01* | (2006.01) |
| *G01B 11/02* | (2006.01) |
| *G01S 17/42* | (2006.01) |
| *G01S 17/89* | (2006.01) |
| *G01S 7/481* | (2006.01) |

(56) References Cited

U.S. PATENT DOCUMENTS

| | | |
|---|---|---|
| 2012/0236320 A1 | 9/2012 | Steffey et al. |
| 2012/0262550 A1 | 10/2012 | Bridges |
| 2012/0327190 A1 * | 12/2012 | Massanell et al. ............ 348/46 |

FOREIGN PATENT DOCUMENTS

| | | |
|---|---|---|
| WO | 2013083650 A1 | 6/2013 |
| WO | 2013083706 A1 | 6/2013 |
| WO | 2013083730 A1 | 6/2013 |
| WO | 2013167472 A1 | 11/2013 |
| WO | 2014068073 A1 | 5/2014 |

* cited by examiner

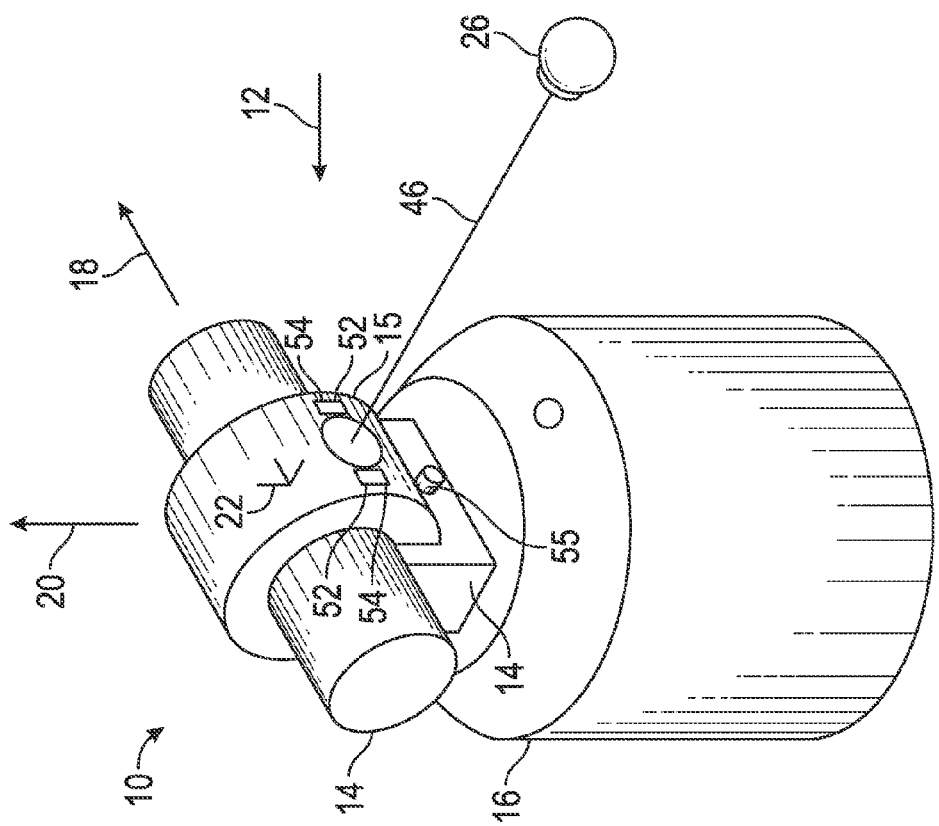
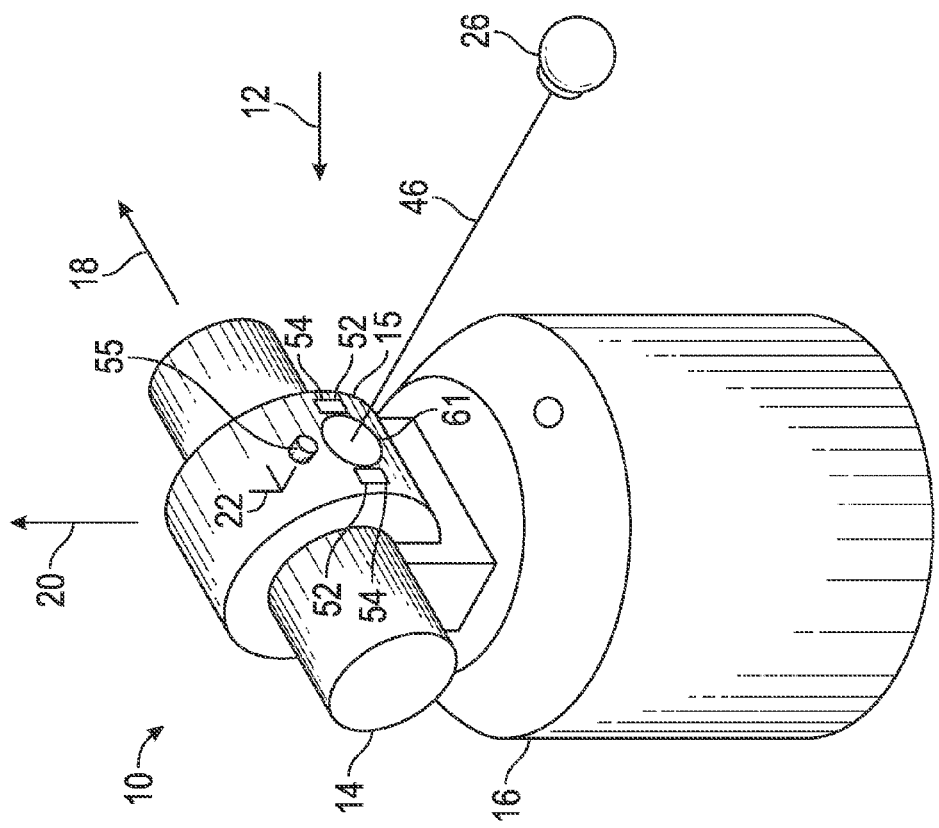

THREE-DIMENSIONAL MEASUREMENT DEVICE HAVING THREE-DIMENSIONAL OVERVIEW CAMERA

CROSS-REFERENCE TO RELATED APPLICATIONS

The present application is a non-provisional application of U.S. Provisional Application 61/844,631 filed on Jul. 10, 2013, the contents of which are incorporated by reference herein in their entirety.

BACKGROUND

The present disclosure relates to a coordinate measuring device. One set of coordinate measurement devices belongs to a class of instruments that measure the three-dimensional (3D) coordinates of a point by sending a laser beam to the point, where it is intercepted by a retroreflector target. The instrument finds the coordinates of the point by measuring the distance and the two angles to the target. The distance is measured with a distance-measuring device such as an absolute distance meter (ADM) or an interferometer. The angles are measured with an angle-measuring device such as an angular encoder. A gimbaled beam-steering mechanism within the instrument directs the laser beam to the point of interest. Examples of such a device include a laser tracker, a total station, and a time-of-flight (TOF) scanner.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The apex of the cube corner, which is the common point of intersection of the three mirrors, is located at the center of the sphere. It is common practice to place the spherical surface of the SMR in contact with an object under test and then move the SMR over the surface being measured. Because of this placement of the cube corner within the sphere, the perpendicular distance from the apex of the cube corner to the surface of the object under test remains constant despite rotation of the SMR. Consequently, the 3D coordinates of a surface can be found by having a tracker follow the 3D coordinates of an SMR moved over the surface. It is possible to place a glass window on the top of the SMR to prevent dust or dirt from contaminating the glass surfaces.

A gimbal mechanism within the laser tracker may be used to direct a laser beam from the tracker to the SMR. Part of the light retroreflected by the SMR enters the laser tracker and passes onto a position detector. The position of the light that hits the position detector is used by a tracker control system to adjust the rotation angles of the mechanical azimuth and zenith axes of the laser tracker to keep the laser beam centered on the SMR. In this way, the tracker is able to follow (track) the SMR.

Angular encoders attached to the mechanical azimuth and zenith axes of the tracker may measure the angle of rotation about the azimuth and zenith axes of the laser beam (with respect to the tracker frame of reference). The one distance measurement and two angle measurements performed by the laser tracker are sufficient to completely specify the three-dimensional location of the SMR.

As mentioned previously, two types of distance meters may be found in laser trackers: interferometers and absolute distance meters (ADMs). In the laser tracker, an interferometer (if present) may determine the distance from a starting point to a finishing point by counting the number of increments of known length (usually the half-wavelength of the laser light) that pass as a retroreflector target is moved between the two points. If the beam is broken during the measurement, the number of counts cannot be accurately known, causing the distance information to be lost. By comparison, the ADM in a laser tracker determines the absolute distance to a retroreflector target without regard to beam breaks, which also allows switching between targets. Because of this, the ADM is said to be capable of "point-and-shoot" measurement. Initially, absolute distance meters were only able to measure stationary targets and for this reason were always used together with an interferometer. However, some modern absolute distance meters can make rapid measurements, thereby eliminating the need for an interferometer.

Some laser trackers include one or more cameras. A camera axis may be coaxial with the measurement beam or offset from the measurement beam by a fixed distance or angle. A camera may be used to provide a wide field of view to locate retroreflectors. A modulated light source placed near the camera optical axis may illuminate retroreflectors, thereby making them easier to identify. In this case, the retroreflectors flash in phase with the illumination, whereas background objects do not. One application for such a camera is to detect multiple retroreflectors in the field of view and measure each in an automated sequence.

Some laser trackers have the ability to measure with six degrees of freedom (DOF), which may include three coordinates, such as x, y, and z, and three rotations, such as pitch, roll, and yaw. Several systems based on laser trackers are available or have been proposed for measuring six degrees of freedom.

Laser scanners determine the 3D coordinates of points on an object surface by projecting a beam of light directly onto the surface and then collecting and analyzing the reflected light. Laser scanners are typically used for scanning closed or open spaces such as interior areas of buildings, industrial installations and tunnels. Laser scanners are used for many purposes, including industrial applications and accident reconstruction applications. A laser scanner can be used to optically scan and measure objects in a volume around the scanner through the acquisition of surface points representing objects within the volume.

Some contemporary laser scanners may also include a camera mounted on or integrated into the laser scanner for gathering camera digital images of the environment and for presenting the camera digital images to an operator. By viewing the camera images, the operator can determine the extent of the measured volume and adjust the settings of the laser scanner to measure over a larger or smaller region of space. In addition, the camera digital images may be transmitted to a processor to add color to the scanner image.

The acquisition of three-dimensional coordinates of surface points by laser scanners may result in a large volume of data involving millions of surface points. Many of these surface points may not be needed in order to adequately represent objects or surfaces within the scanned volume. Some extraneous data may be removed during postprocessing.

It is often the case that it is useful to characterize in three dimensions the environment surrounding the 3D measuring instrument. Ordinarily such information must be provided by an operator. Accordingly, while existing 3D measuring instruments are suitable for their intended purposes the need for improvement remains.

SUMMARY

In accordance with an embodiment of the invention, a coordinate measurement device is provided. The measurement device sends a first beam of light to a remote target, the remote target returning a part of the first beam of light as a second beam of light, the coordinate measurement device having a device frame of reference. The measurement device having a first motor and a second motor that cooperate to direct the first beam of light to a first direction. The first direction being determined by a first angle of rotation about a first axis and a second angle of rotation about a second axis, the first angle of rotation produced by the first motor and the second angle of rotation produced by the second motor. A first angle measuring device is provided that measures the first angle of rotation and a second angle measuring device that measures the second angle of rotation. A distance meter is provided that measures a first distance from the coordinate measurement device to the remote target based at least in part on the second beam of light received by an optical detector. A first portion of the coordinate measurement device rotates about the first axis. A second portion of the coordinate measurement device rotates about the second axis. A third portion of the coordinate measurement device is fixed relative to the movements about the first axis and the second axis. A 3D time-of-flight (TOF) camera is positioned on a periphery of a portion of the coordinate measurement device, the portion selected from the group consisting of the first portion, the second portion, and the third portion, the camera configured to acquire a camera image of an object. A processor is configured to determine at least one first three-dimensional (3D) coordinate in the device frame of reference of the remote target, the at least one first 3D coordinate based at least in part on the first distance, the first angle of rotation, and the second angle of rotation, the processor further being configured to determine a plurality of second 3D coordinates in the device frame of reference of the object, the plurality of second 3D coordinates being based at least in part on the camera image, the first angle of rotation, and the second angle of rotation.

In accordance with an embodiment of the invention, a coordinate measurement device is provided. The measurement device sends a first beam of light to a remote target, the remote target returning a part of the first beam of light as a second beam of light, the device having a device frame of reference. The measurement device having a first motor and a second motor that cooperate to direct the first beam of light to a first direction. The first direction determined by a first angle of rotation about a first axis and a second angle of rotation about a second axis, the first angle of rotation produced by the first motor and the second angle of rotation produced by the second motor. A first angle measuring device is provided that measures the first angle of rotation and a second angle measuring device that measures the second angle of rotation. A distance meter is provided that measures a first distance from the coordinate measurement device to the remote target based at least in part on a first part of the second beam of light received by a first optical detector. A light-field camera is positioned on the coordinate measurement device, the light-field camera including a microlens array and a photosensitive array, the light-field camera configured to acquire a camera image of an object. A processor is configured to determine a first three-dimensional (3D) coordinate of the remote target in the device frame of reference, the 3D coordinate based at least in part on the first distance, the first angle of rotation, and the second angle of rotation. The processor further being configured to bring the object into focus and to determine a plurality of second 3D coordinates of the object in the device frame of reference, the plurality of second 3D coordinates based at least in part on the camera image, the first angle of rotation and the second angle of rotation.

In accordance with another embodiment of the invention, a method for optically scanning and measuring an environment is provided. The method including the steps of: providing a device having a first motor and a second motor that cooperate to direct a first beam of light to a first direction, the first direction determined by a first angle of rotation about a first axis and a second angle of rotation about a second axis, the device further having a first portion that rotates about the first axis, a second portion that rotates about the second axis and a third portion that is fixed relative to the movements about the first axis and the second axis, the device further having a distance meter arranged to receive a second light beam reflected by a remote target, the second light beam being a portion of the first light beam, the device having a device frame of reference; providing a three-dimensional (3D) camera operably coupled to a periphery of one of the first portion, the second portion or the third portion, the 3D camera selected from the group consisting of a time-of-flight (TOF) camera and a light-field camera; acquiring a camera image of an object with the 3D camera; rotating the first portion with the first motor to the first angle of rotation and the second portion with the second motor to the second angle of rotation; emitting the first beam of light and receiving the second light beam reflected off of the remote target; determining a first distance to the remote target with the distance meter in response to receiving the second light beam; determining at least one first 3D coordinate of the remote target in the device frame of reference, the at least one first 3D coordinates based at least in part on the first distance, the first angle of rotation and the second angle of rotation; and determining a plurality of second 3D coordinates of the object in the device frame of reference, the second 3D coordinates based at least in part on the camera image, the first angle of rotation and the second angle of rotation.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIGS. 1A-1C show perspective views of exemplary laser trackers;

DETAILED DESCRIPTION OF THE PREFERRED EMBODIMENTS

Figure 1C:
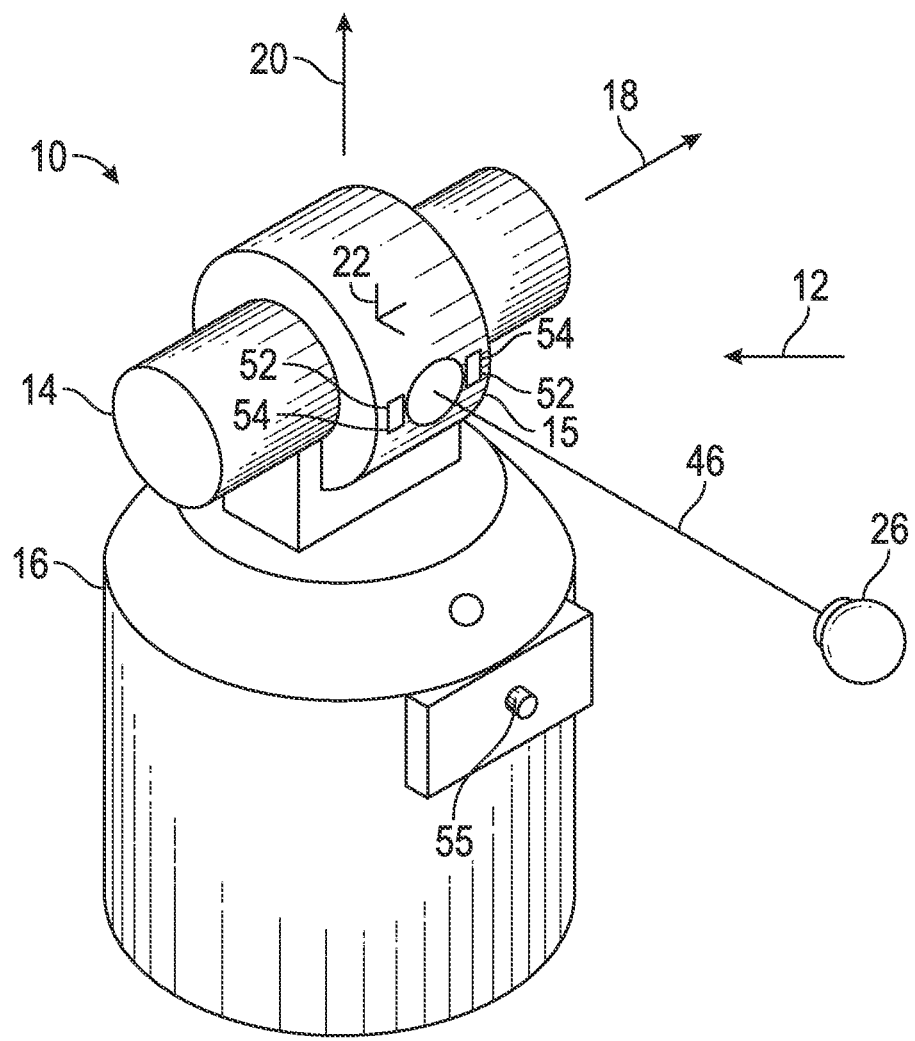

Referring to FIG. 1, an exemplary measurement device, such as laser tracker 10 for example, is shown. An exemplary gimbaled beam-steering mechanism 12 of laser tracker 10 comprises zenith carriage 14 mounted on azimuth base 16 and rotated about azimuth axis 20. Payload 15 is mounted on zenith carriage 14 and rotated about zenith axis 18. Zenith mechanical rotation axis 18 and azimuth mechanical rotation axis 20 intersect orthogonally, internally to laser tracker 10, at gimbal point 22, which is typically the origin for distance measurements. The laser tracker uses a beam of light, such as laser beam 46 for example, that virtually passes through gimbal point 22 and is pointed orthogonal to zenith axis 18. In other words, laser beam 46 is in the plane normal to zenith axis 18. Laser beam 46 is pointed in the desired direction by motors within the tracker laser (not shown) that rotate payload 15 about zenith axis 18 and azimuth axis 20. Zenith and azimuth angular encoders, internal to the laser tracker (not shown), are coupled to zenith mechanical axis 18 and azimuth mechanical axis 20 and indicate, to high accuracy, the angles of rotation. Laser beam 46 travels to external retroreflector 26 such as a spherically mounted retroreflector (SMR) 26. By measuring the radial distance between gimbal point 22 and retroreflector 26 and the rotation angles about the zenith and azimuth axes 18, 20, the position of retroreflector 26 is found within the spherical coordinate system of the laser tracker 10 (i.e. the device frame of reference).

Laser beam 46 may comprise one or more laser wavelengths. For clarity and simplicity, a steering mechanism of the sort shown in FIG. 1 is assumed in the following discussion and the claimed invention should not be so limited. In other embodiments different types of steering mechanisms are possible. For example, it would be possible to reflect a laser beam off a mirror rotated about the azimuth and zenith axes. The techniques described here are applicable, regardless of the type of steering mechanism.

In exemplary laser tracker 10, cameras 52 and light sources 54 are located on payload 15. Light sources 54 illuminate one or more retroreflector targets 26. Light sources 54 may be LEDs electrically driven to repetitively emit beams of pulsed light. Each camera 52 comprises an optical detector, such as a photosensitive array for example, and a lens placed in front of the photosensitive array. The photosensitive array may be a CMOS or CCD array. The lens may have a relatively wide field of view, say thirty or forty degrees. The purpose of the lens is to form an image on the photosensitive array of objects within the field of view of the lens. Each light source 54 is placed near camera 52 so that light from light source 54 is reflected off each retroreflector target 26 onto camera 52. In this way, retroreflector images are readily distinguished from the background on the photosensitive array as their image spots are brighter than background objects and are pulsed. There may be two cameras 52 and two light sources 54 placed about the line of laser beam 46. By using two cameras in this way, the principle of triangulation can be used to find the three-dimensional coordinates of any SMR within the field of view of the camera. In addition, the three-dimensional coordinates of the SMR can be monitored as the SMR is moved from point to point. A use of two cameras for this purpose is described in commonly owned U.S. Published Patent Application No. 2010/0128259 to Bridges which is incorporated by reference herein.

Other arrangements of one or more cameras and light sources are possible. For example, a light source and camera can be coaxial or nearly coaxial with the laser beams emitted by the tracker. In this case, it may be necessary to use optical filtering or similar methods to avoid saturating the photosensitive array of the camera with the laser beam from the tracker.

In the exemplary embodiment, the laser tracker 10 further includes a three-dimensional (3D) camera device 55. The 3D-camera device 55 is capable of capturing both visual and distance information. As used herein, a 3D-camera is a device having a single photosensitive array capable of determining the distance to an object surface over a plurality of pixels on the 3D-camera image sensor. Each of the pixels also corresponds to an angle relative to the 3D-camera image sensor.

Both the distance and angle corresponding to each pixel can be transformed into the device frame of reference (i.e. the local coordinate frame) of the laser tracker 10 using mathematical methods that are well known to users of ordinary skill in the art. Depending on the type of 3D-camera image sensor, the 3D-camera image sensor may use using either natural light or an external light source to obtain 3D coordinates. Unlike a scanner that uses triangulation principles with a 3D-camera there may be no fixed geometrical relationship between the 3D-camera image sensor and the light source. It should be appreciated that in most cases the accuracy of the 3D-camera is significantly less than that of the laser tracker 10. The 3D-camera may include, but is not limited to a light-field camera and a time-of-flight (TOF) camera.

A light-field camera, sometimes referred to as a plenoptic camera, includes 3D camera that uses a microlens array to capture 4D light field information about the acquired image. In an embodiment, an array of microlenses is placed at the focal plane of a camera main lens. An image sensor is positioned slightly behind the microlenses. The image sensor might be a photosensitive array such as a CMOS or CCD array. Using images collected by the image sensor, the displacement of image parts that are not in focus are analyzed to extract depth information. A light field camera may operate based on natural light, a light source coupled to the 3D camera or a light source external (decoupled) from the 3D-camera.

One type of TOF camera uses an RF modulated light source with a phase detector. Such TOF cameras are made by PMD Technologies GmbH of Siegen, Germany and Mesa Imaging AG of Zurich, Switzerland for example. These devices work by modulating the outgoing beam with an RF carrier, measuring the phase shift of the reflected light, and determining a distance to the target based on the phase shift and on the speed of light in air.

Another type of TOF camera is a range gated imager. Such TOF cameras are made by Frunhofer IMS of Duisburg, Germany, and TriDiCam GmbH of Duisbug, Germany for example. Range gated imagers include a built-in shutter in front of an image sensor. The shutter sends out light pulses at the same rate the shutter opens and closes. By looking at the fraction of the light pulse received, the distance to the target is calculated.

A third type of TOF camera is a direct TOF imager. Such a TOF camera made by Advanced Scientific Concepts, Inc. of Santa Barbara, Calif. for example, makes a variety of products referred to as 3D flash LIDAR cameras. These devices emit a single pulse of laser light that reflects off objects before returning to camera, which includes a lens and photosensitive array. The devices use a readout integrated circuit (ROIC) in a "trigger mode" to capture spatial and temporal information using a single pulse.

Many types of TOF 3D-cameras are possible, and the present invention is not limited to the types described hereinabove. Each of the sensor arrays that provide distance measurements also provides angle measurements, as the angle to each point of an array of the TOF 3D-camera may be calculated based at least in part on the position of the pixel and on the focal length of a lens within the 3D-camera.

In an embodiment, a 3D camera is positioned on a periphery of an external frame or surface of the laser tracker housing so as to enable relatively large fields of view (FOV) to be obtained. In a contrasting method in which a 3D camera is located internal to a tracker, total station, or scanner. When located internal to the device, the FOV is necessarily made very narrow by the presence of the exit aperture of the 3D instrument. This limited FOV is avoided in an embodiment by positioning the 3D camera 55 on the payload 15, which is the portion of the tracker that rotates about the axis 18. The FOV may be selected in this case to be between 30 to 40 degrees so as to enable a work area to be visualized in a single shot. However, because the payload may be turned about the axes 18 and 20 in FIG. 1A, the entire measurement volume is accessible to viewing by the 3D camera 55. In an embodiment, the FOV of the 3D camera 55 located, when located on the payload 15, is at least +/−20 degrees (a full angle of 40 degrees).

In another embodiment shown in FIG. 1B, the 3D-camera 55 is disposed on the zenith carriage 14, which is the portion of the tracker (or scanner) that rotates about the azimuth axis 20. In this case, the 3D-camera 55 rotates about the azimuth axis 20 but remains at a fixed location relative to the zenith axis 18. Such a camera has a relatively wide FOV for it to view a desired portion of the potential measurement volume of the tracker or scanner. In an embodiment the 3D camera 55 attached to the zenith carriage 14 has a FOV of at least +/−40 degrees (a full angle of 80 degrees).

In an embodiment shown in FIG. 1C, a 3D-camera 55, fixed relative to both the azimuth axis 20 and the zenith axis 18, is coupled to the base 16. In an embodiment, since the 3D-camera 55 is fixed relative to the moving portion of the laser tracker or scanner, the 3D camera 55 attached to the base 16 has a FOV of at least +/−60 degrees (a full angle of 120 degrees).

In further embodiments represented by FIG. 1A, 1B, or 1C, the 3D camera is a light-field camera that provides not only 3D coordinates of foreground objects being measured but also has the ability to refocus and provide sharp images of the imaged objects after the image is acquired. This is even true if some of objects near to and far from the camera are captured in the same image, as will often be the case when the 3D camera captures a wide FOV. As used herein, the term "focal distance" means the in-focus distance from the 3D camera to a plane or point in which an object is positioned. Within a given image acquired by a light-field camera, there may be multiple objects or portions of objects, each at a different focal distance. In a light-field camera, each of these focal distances may be selectively determined during subsequent post-processing of the image. In one embodiment, all or substantially all of the objects within the image may be brought into focus during post-processing of the image to provide an image where all of the objects are simultaneously in focus.

Although FIGS. 1A, 1B, and 1C show the 3D-camera 55 affixed to the tracker 10, it should be understood that a separate 3D-camera 55 may be detached from the tracker. Such a separate 3D-camera may provide received information to internal processors with the laser tracker 10 or to an external computer, such as computer 80 shown in FIG. 2.

Figure 2:
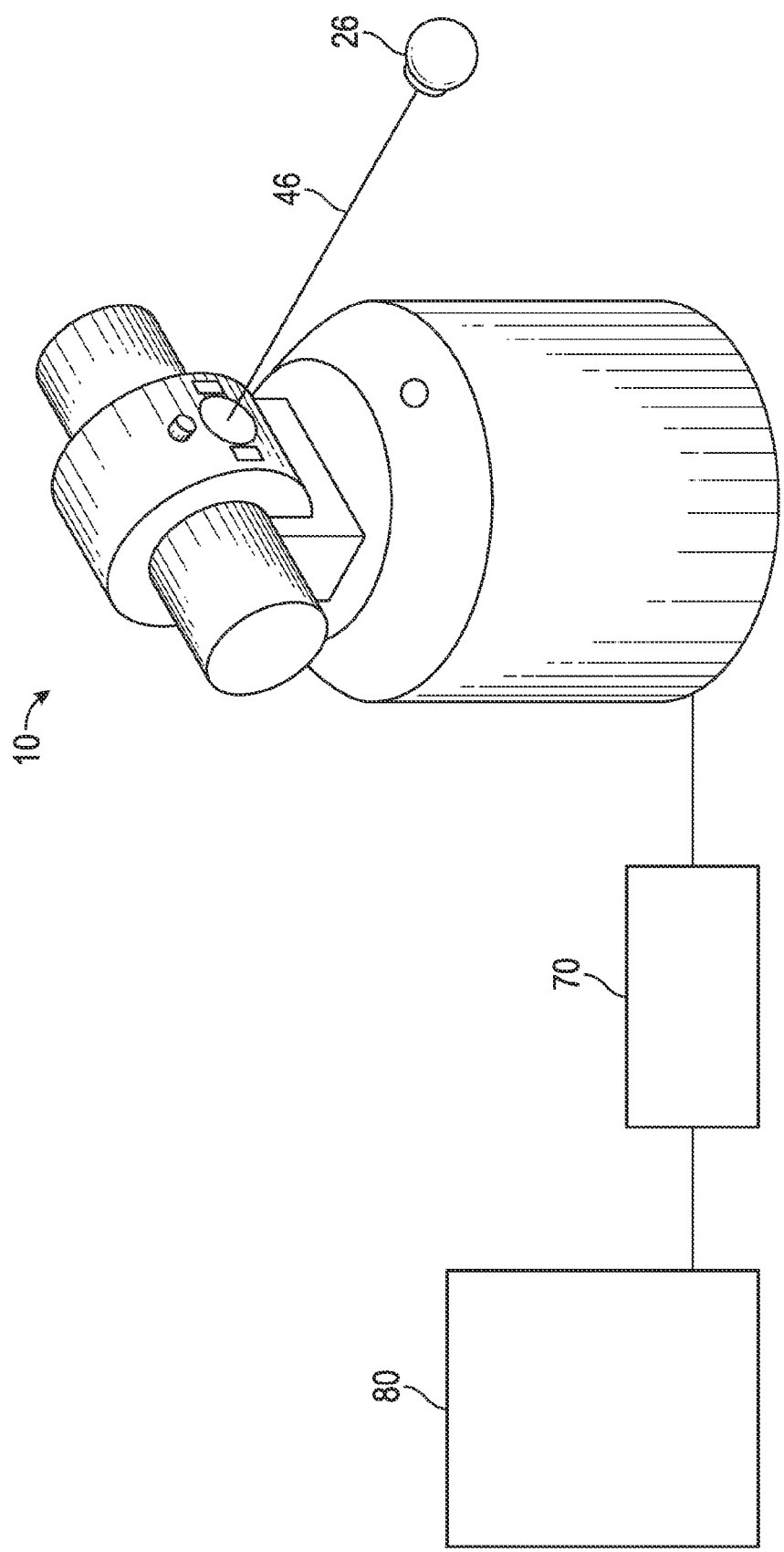
FIG. 2 shows computing and power supply elements attached to the laser tracker of FIG. 1.

Referring now to FIG. 2, an embodiment is shown of a laser tracker 10 having an auxiliary unit 70. The auxiliary unit 70 supplies electrical power to the laser tracker 10 and in some cases also provides computing and clocking capability. In one embodiment, the separate auxiliary unit 70 is eliminated by moving the functionality of auxiliary unit 70 into the tracker base 16. In most cases, auxiliary unit 70 is attached to general purpose computer 80. Application software loaded onto general purpose computer 80 may provide application capabilities such as reverse engineering. It is also possible to eliminate general purpose computer 80 by building its computing capability directly into laser tracker 10. In this case, a user interface, possibly providing keyboard and mouse functionality is built into laser tracker 10. The connection between auxiliary unit 70 and computer 80 may be wireless, such as through Wi-Fi or Bluetooth communications, for example, or be wired through a cable of electrical wires, such as a serial, coaxial or Ethernet cable for example. Computer 80 may be connected to a network, and auxiliary unit 70 may also be connected to a network. In one embodiment, the application software is operated in a distributed computing environment. It should be appreciated that the computer 80 may be directly coupled to the auxiliary unit 70, or may be remote from the laser tracker 10 and connected via a local or wide area network. Plural instruments, such as multiple measurement instruments or actuators for example, may be connected together, either through computer 80 or auxiliary unit 70.

The laser tracker 10 may be rotated on its side, rotated upside down, or placed in an arbitrary orientation. In these situations, the terms azimuth axis and zenith axis have the same direction relative to the laser tracker as the directions shown in FIG. 1 regardless of the orientation of the laser tracker 10.

In another embodiment, the payload 15 is replaced by a mirror that rotates about the azimuth axis 20 and the zenith axis 18. A laser beam is directed upward and strikes the mirror, from which it launches toward a retroreflector 26. In still another embodiment, the payload 15 may be replaced by a two or more galvanometer mirrors that are rotated independently of each other to direct the laser beam to the desired location.

Figure 3:
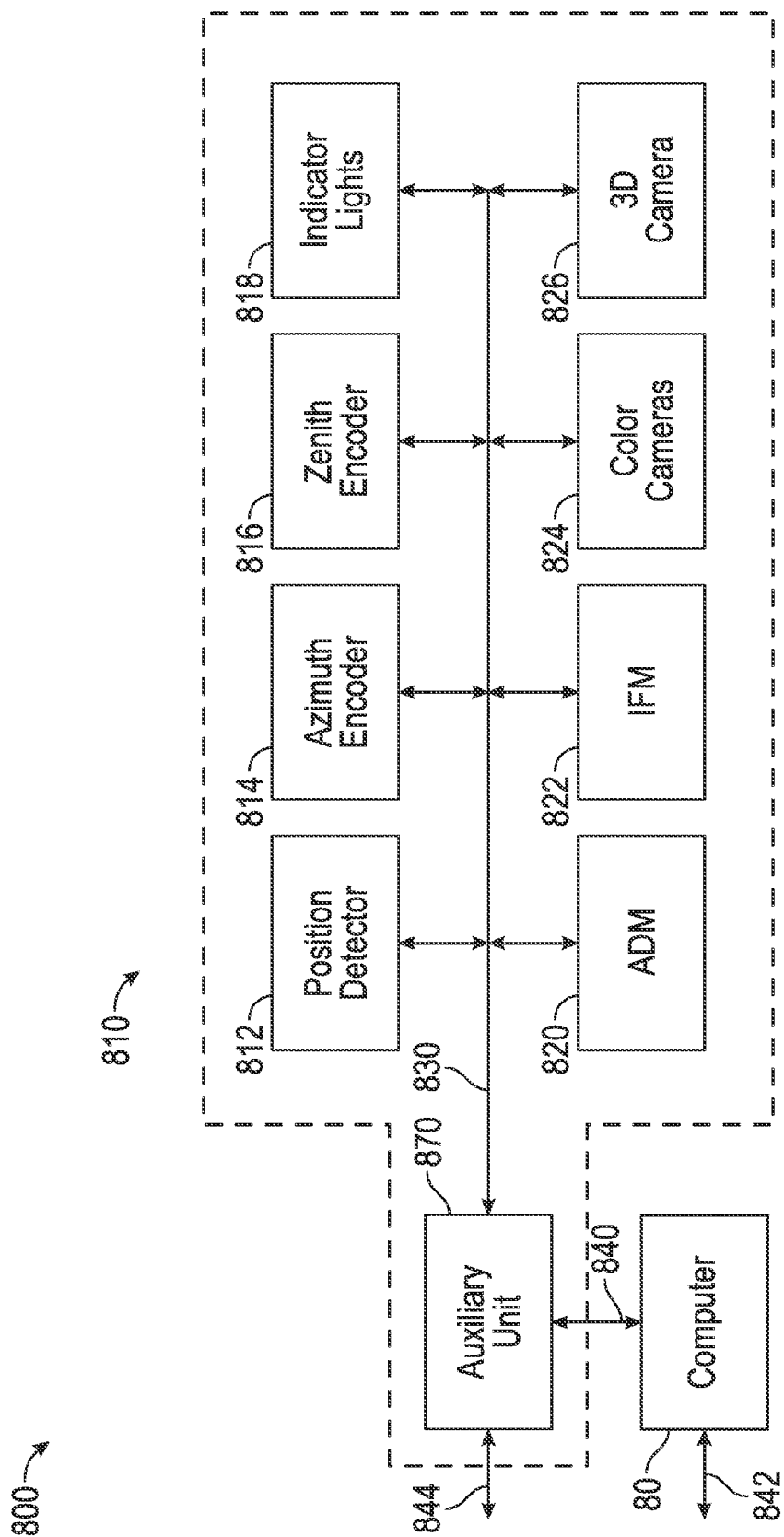
FIG. 3 is a block diagram an electronics processing system associated with the laser tracker of FIG. 1.

The methods for operating the laser tracker 10 discussed herein may be implemented by means of processing system 800 shown in FIG. 3. Processing system 800 comprises tracker processing unit 810 and optionally computer 80. Processing unit 810 includes at least one processor, which may be a microprocessor, digital signal processor (DSP), field programmable gate array (FPGA), or similar device. Processing capability is provided to process information and issue commands to internal tracker processors. Such processors may include position detector processor 812, azimuth encoder processor 814, zenith encoder processor 816, indicator lights processor 818, ADM processor 820, interferometer (IFM) processor 822, and color camera processor 824. As will be discussed in more detail below, the processing unit 810 may also include a 3D camera processor or engine 826. Auxiliary unit processor 870 optionally provides timing and microprocessor support for other processors within tracker processor unit 810. It may communicate with other processors by means of device bus 830, which may transfer information throughout the tracker by means of data packets, as is well known in the art. Computing capability may be distributed throughout tracker processing unit 810, with DSPs and FPGAs performing intermediate calculations on data collected by tracker sensors. The results of these intermediate calculations are returned to auxiliary unit processor 870. As explained herein, auxiliary unit 70 may be attached to the main body of laser tracker 10 through a cable, or it may be arranged within the main body of the laser tracker so that the tracker attaches directly (and optionally) to computer 80. Auxiliary unit 870 may be connected to computer 80 by connection 840, which may be an Ethernet cable or wireless connection, for example. Auxiliary unit 870 and computer 80 may be connected to the network through connections 842, 844, which may be Ethernet cables or wireless connections, for example.

It should be appreciated that while embodiments herein describe the use of the 3D-camera 55 with the laser tracker 10, this is for exemplary purposes and the claimed invention should not be so limited. In one embodiment shown in reference to FIGS. 4 and 5, the 3D-camera is used with a time-of-light (TOF) laser scanner 200. The term TOF is understood to mean a measurement made based on a travel time of light in traveling between two points. As such, this method uses knowledge of the speed of light of the air through which light travels. In a TOF of flight device, any method based on the travel time of light may be used to measure the travel time between two points. For example, the light may be pulsed, and the time determined according to the travel time between a pulse when emitted and the pulse when returned. As another example, the light may be modulated in optical power in a sinusoidal pattern, and the time determine according to the travel time as calculated from a phase shift in the sinusoidal modulation obtained from an optical detector at the TOF flight device. The TOF laser scanner 200 may be similar to the one described in commonly-owned U.S. patent application Ser. No. 13/510,020 filed on Nov. 11, 2010, the contents of which is incorporated herein by reference. In this embodiment, the laser light is emitted from the light source 202 and reflected off of a rotating mirror 204. The TOF scanner 200 is rotated about a first axis 206, while the mirror is rotated about a second axis 208 to optically scan the environment. The first axis 206 is orthogonal to the second axis 208. The light is reflected off a surface in the environment and a portion returns along the path of the emitted laser light and is once again reflected by the rotating mirror 204, whereupon it is collimated by a lens 210 and reflected off mirror 212 into light receiver 214. Using the time it takes the laser light to be emitted from the laser scanner 200 and reflected and returned, the distance from the laser tracker to the surface may be determined. Using angular measurements of rotation about the first axis 206 and the second axis 208, the 3D coordinates for points on the surface may be determined in the laser scanner frame of reference.

Figure 4:
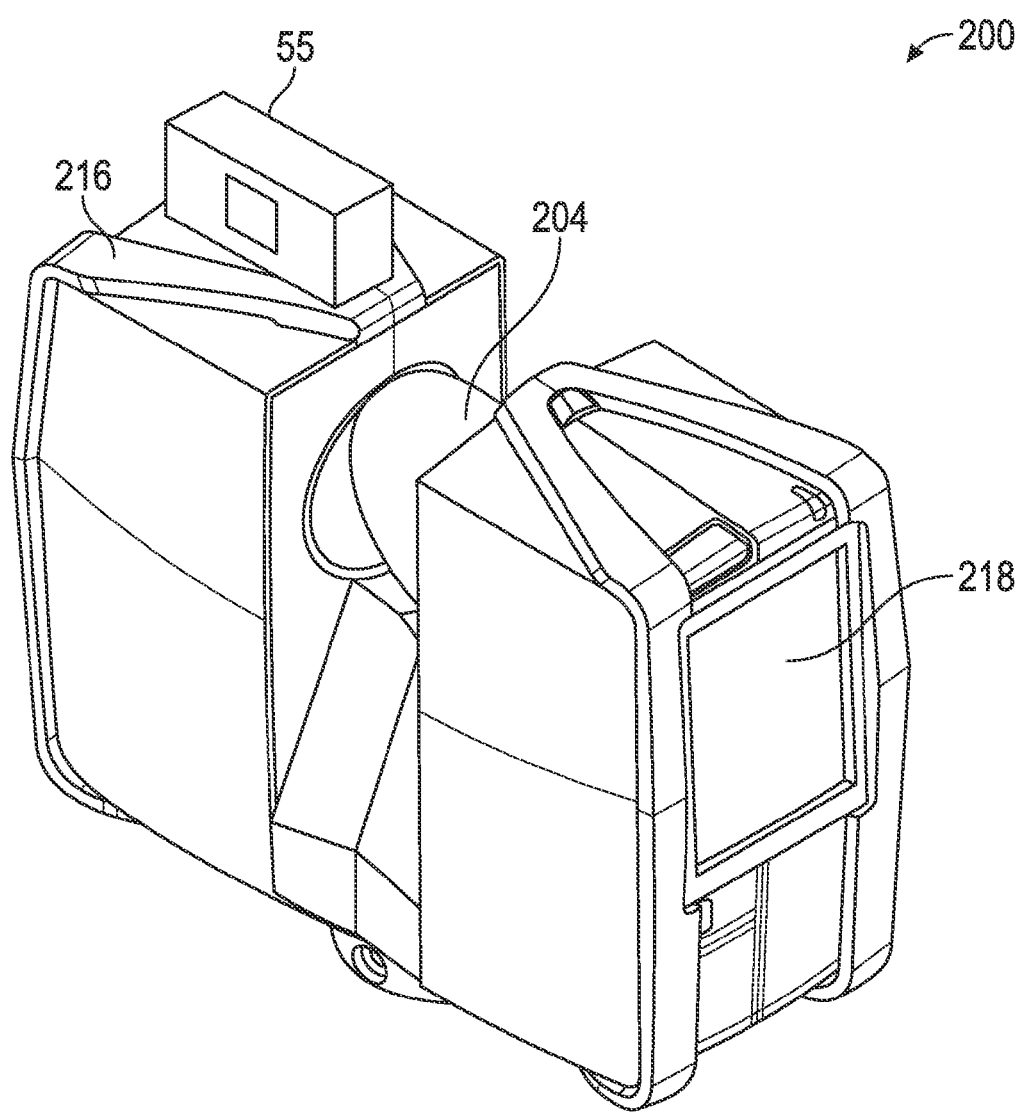
FIG. 4 is a perspective view of a laser scanner device in accordance with an embodiment of the invention.
Figure 5:
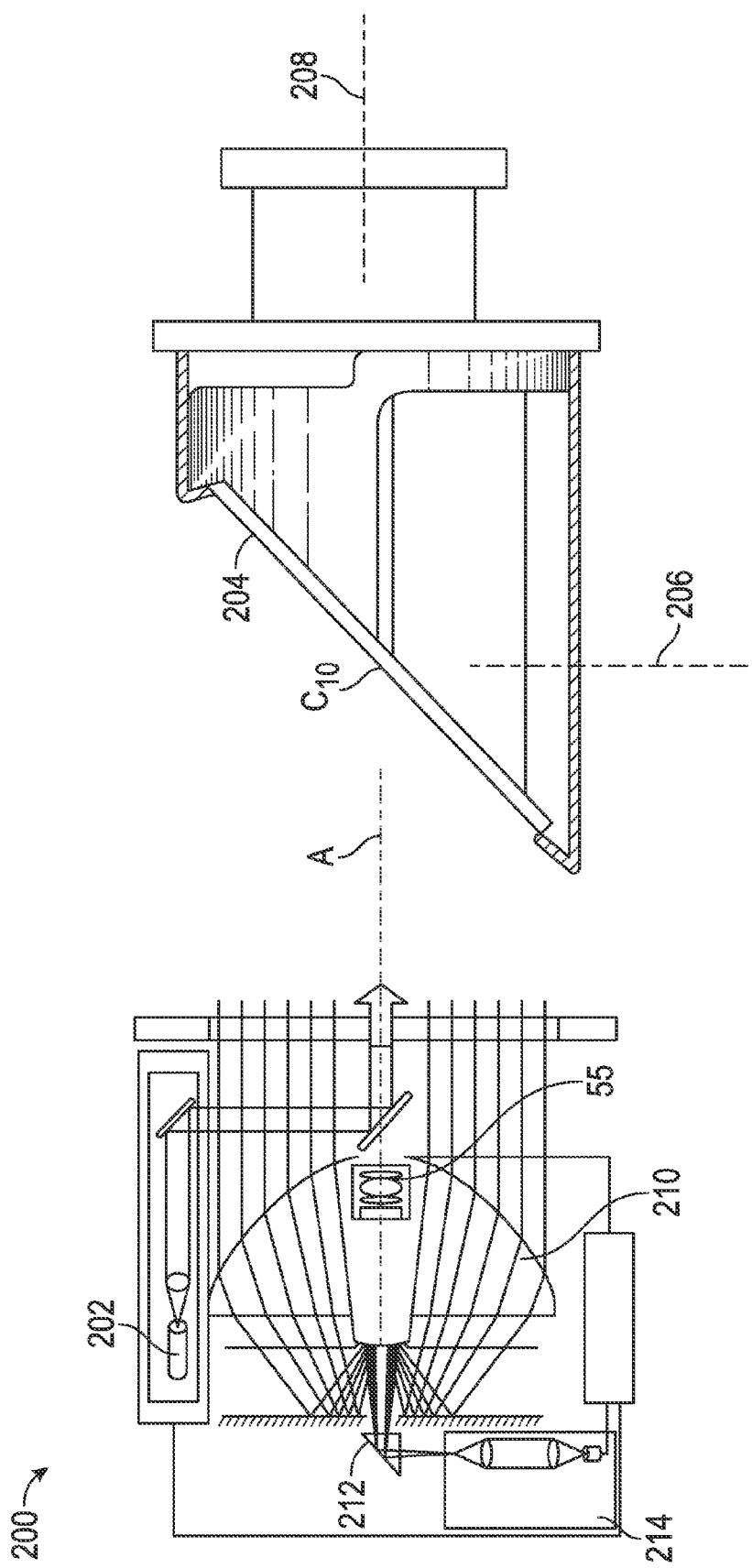
FIG. 5 is a schematic illustration of the laser scanner of FIG. 4.

In one embodiment, shown in FIG. 4, the 3D-camera 55 is mounted to a periphery surface of a structure or housing 216. In another embodiment, shown in FIG. 5, the 3D-camera 55 is positioned internally to the scanner housing 216. In this embodiment, the 3D-camera 55 may be arranged co-axially with the axis 208 such that the 3D-camera 55 obtains images reflected from the mirror 204. It should be appreciated that when the 3D-camera is fixedly coupled to the TOF laser scanner 200 in a known position relative to the local coordinate system of the TOF laser scanner 200, the coordinates of points acquired by the 3D-camera 55 may be transformed into coordinates of the local coordinate system of the TOF laser scanner 200 (i.e. the device frame of reference).

The TOF laser scanner 200 may also include a graphical display 218 that displays a user interface. The user interface may be a touch screen that allows the operator to interact with and control the operation of the scanner 200. In one embodiment, the three-dimensional images captured by the 3D-camera 55 may be displayed on the graphical display 218.

In an embodiment, a TOF 3D-camera is provided on a laser tracker or a TOF laser scanner. In most cases, the TOF 3D-camera will have a lower accuracy than the laser tracker or the TOF laser scanner, but it may be configured to rapidly provide a 3D image over a wide field of view, thereby enabling the laser tracker or TOF laser scanner to take further actions as needed. In the case of a laser tracker, a TOF 3D-camera may identify the outline of an object that is to be inspected and then direct the operator, for example, by projecting a laser beam from the tracker, to each of a series of steps in an inspection plan. A TOF 3D-camera may be used according to a variety of methods to assist in measurements made with a laser tracker or TOF laser scanner. Such methods are not limited by the examples given above.

Figure 6:
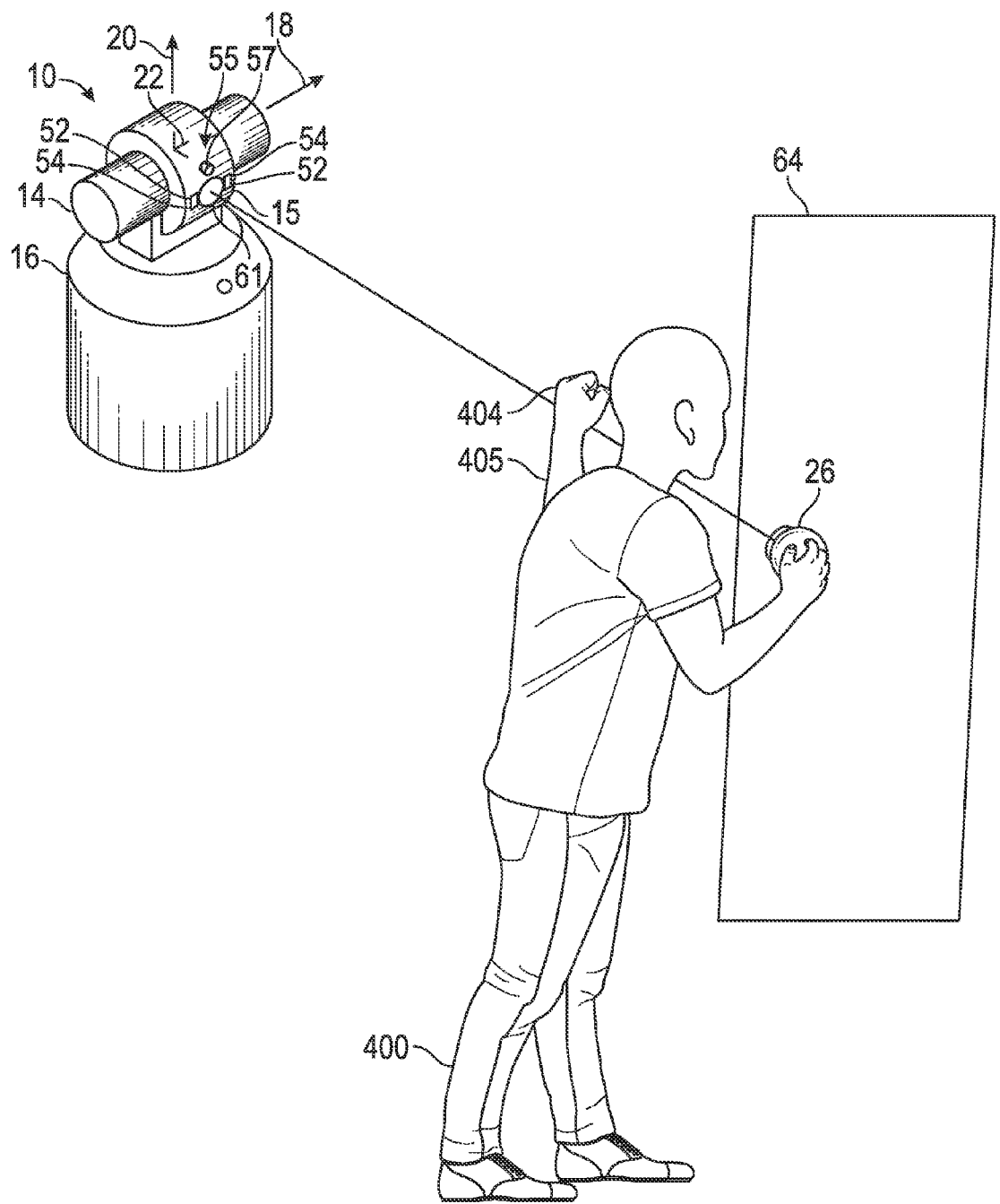
FIG. 6 is a perspective view of the laser tracker of FIG. 1 configured to respond to gestures from the operator.

Referring now to FIG. 6, one exemplary embodiment is illustrated that uses the three-dimensional camera 55 for determining gestures, or command motions by the operator 400. In the illustrated embodiment, the coordinate measurement device is a laser tracker 10 having the 3D-camera 55 mounted to the payload 15 such that that 3D-camera 55 rotates about the azimuth axis and zenith axis. In the exemplary embodiment, the operator 400 is located adjacent the remote target being measured. As used herein, the operator 400 is adjacent the remote target when the operator 400 is positioned within the field of view of the 3D-camera 55.

In one embodiment, the 3D-camera engine 826 of FIG. 3 is a gesture recognition engine that assists in evaluating or parsing of gestures patterns to determine the performed gesture from a plurality of gestures. In one embodiment, the 3D-camera 55 and engine 826 generate a 3D skeletal model of the operator 400 from a plurality of surfaces measured of the operator measured by the 3D-camera 55. This allows for the interpretation of movements and or body positions, such as the position or orientation of the operators hand 404, as commands to be executed by the laser tracker 10. The skeletal model may include information, such as the position of joints on the operator and locations of specific body portions (e.g. hand 404, the arm 405). In one embodiment, the skeletal model identifies the location of different parts of the operator, such as the arm, elbow, hand, fingers and the connecting joints for example.

The gestures engine 826 may include a collection of gesture filters, each comprising information concerning a gesture that may be performed by the user as interpreted through the skeletal model. The data captured by camera 55 in the form of the skeletal model and movements of the skeletal model may be compared to the gesture filters in the gesture engine 826 to identify when an operator (as represented by the skeletal model) has performed one or more gestures. The gestures may be performed by one or more of the operator's body parts, or the relative movement or position of those parts to each other (i.e. spatial configuration). Those gestures may be associated with various controls of the laser tracker 10. In other words, there may be a rule of correspondence between each of a plurality of gestures and each of the plurality of commands or controls for the laser tracker 10. Thus, the processing system 800 may use the gesture engine 826 to interpret movements of the skeletal model and control an application based on body (e.g. hand) position or movements.

The gesture filters may be modular or interchangeable. In one embodiment, the filter has a number of inputs, each having a type, and a number outputs, each having a type. Inputs to the filter may comprise items such as joint data about a user's joint position (e.g. angles formed by the bones that meet at the joint), RGB color data, and the rate of change of an aspect of the user. Outputs from the filter may include parameters such as a confidence level that a particular gesture has been made and the speed of motion of the gesture. Filters may further include contextual parameters that allow for the recognition of particular gestures in response to previous actions. The gestures that may be interpreted by the gesture engine 826 based on three-dimensional data acquired by the 3D-camara 55 include those disclosed in commonly owned U.S. patent application Ser. No. 14/264,420 filed on Apr. 29, 2014, which is incorporated by reference herein in its entirety.

It should be appreciated that while the 3D-camera 55 and the gesture engine 826 are illustrated in use with the laser tracker 10, this is for exemplary purposes and the claimed invention should not be so limited. In other embodiments, the 3D-camera 55 and gesture engine 826 may be used with another coordinate measurement device, such as the laser scanner 200 for example.

In still another embodiment, the 3D-camera 55 is coupled to the laser tracker 10 and acquires a three-dimensional image of the environment around the laser tracker 10. This image is then used to identify the location of the operator and allow the laser tracker 10 to rotate the payload 15 about the azimuth and zenith axis to allow rapid acquisition of the retroreflector 26 with the laser beam 46.

In still other embodiments, the 3D-camera 55 may be used with a laser tracker 10 in an automated system where the 3D-camera is used to identify components within the process. For example, the 3D-camera 55 may capture an image of the process and the engine 826 is used to identify a desired object, such as a robot end effector. Using this information, the laser tracker 10 transforms this information into an azimuth angle and a zenith angle to allow the rotation of the payload 15 to the desired location and the rapid acquisition of a retroreflective target.

The technical effects and benefits of embodiments of the invention include allowing a 3D measurement device to quickly acquire three-dimensional information about the environment or an object being measured. Further technical effects and benefits of embodiments of the invention provide for the association of rapidly 3D coordinates with a first measurement device with 3D coordinates made with a second measurement device in the same frame of reference. Still further technical effects and benefits of embodiments of the invention provide for the determining and the carrying out of operational commands on the measurement device in response to the movement, body position or gestures performed by an operator adjacent the object or area being measured.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A coordinate measurement device that sends a first beam of light to a remote target, the remote target returning a part of the first beam of light as a second beam of light, the coordinate measurement device having a device frame of reference, the measurement device comprising:
  a first motor and a second motor that cooperate to direct the first beam of light to a first direction, the first direction determined by a first angle of rotation about a first axis and a second angle of rotation about a second axis, the first angle of rotation produced by the first motor and the second angle of rotation produced by the second motor;
  a first angle measuring device that measures the first angle of rotation and a second angle measuring device that measures the second angle of rotation;
  a distance meter that measures a first distance from the coordinate measurement device to the remote target based at least in part on the second beam of light received by an optical detector;
  a first portion of the coordinate measurement device that rotates about the first axis;
  a second portion of the coordinate measurement device that rotates about the second axis;
  a third portion of the coordinate measurement device that is fixed relative to the movements about the first axis and the second axis;
  a 3D time-of-flight (TOF) camera positioned on a periphery of a portion of the coordinate measurement device, the portion selected from the group consisting of the first portion, the second portion, and the third portion, the camera configured to acquire a camera image of an object; and
  a processor configured to determine at least one first three-dimensional (3D) coordinate in the device frame of reference of the remote target, the at least one first 3D coordinate based at least in part on the first distance, the first angle of rotation, and the second angle of rotation, the processor further being configured to determine a plurality of second 3D coordinates in the device frame of reference of the object, the plurality of second 3D coordinates being based at least in part on the camera image, the first angle of rotation, and the second angle of rotation.

2. The coordinate measurement device of claim 1 wherein the remote target is a retroreflector target, the coordinate measurement device further comprising:
  a position detector, a second part of the second beam of light passing onto the position detector, the position detector configured to produce a first signal in response to a position of the second part on the position detector; and
  a control system that sends a second signal to the first motor and a third signal to the second motor, the second signal and the third signal based at least in part on the first signal, the control system configured to adjust the first direction of the first beam of light to the position in space of the retroreflector target.

3. The coordinate measurement device of claim 1 wherein the remote target is a surface of the object.

4. The coordinate measurement device of claim 1 wherein the 3D TOF camera includes an RF modulated light source and a phase detector.

5. The coordinate measurement device of claim 1 wherein the 3D TOF camera is selected from the group consisting of a range gated imager and a direct TOF imager.

6. The coordinate measurement device of claim 1 wherein the 3D TOF camera is positioned on a periphery of the first portion and the camera has a field-of-view (FOV) of at least +/−20 degrees.

7. The coordinate measurement device of claim 1 wherein the 3D TOF camera is positioned on a periphery of the second portion and the camera has a FOV of at least +/−40 degrees.

8. The coordinate measurement device of claim 1 wherein the 3D TOF camera is positioned on a periphery of the third portion and the camera has a FOV of at least +/−60 degrees.

9. A coordinate measurement device that sends a first beam of light to a remote target, the remote target returning a part of the first beam of light as a second beam of light, the device having a device frame of reference, the measurement device comprising:
  a first motor and a second motor that cooperate to direct the first beam of light to a first direction, the first direction determined by a first angle of rotation about a first axis and a second angle of rotation about a second axis, the first angle of rotation produced by the first motor and the second angle of rotation produced by the second motor;
  a first angle measuring device that measures the first angle of rotation and a second angle measuring device that measures the second angle of rotation;
  a distance meter that measures a first distance from the coordinate measurement device to the remote target based at least in part on a first part of the second beam of light received by a first optical detector;

a light-field camera positioned on the coordinate measurement device, the light-field camera including a microlens array and a photosensitive array, the light-field camera configured to acquire a camera image of an object; and a processor configured to determine a first three-dimensional (3D) coordinate of the remote target in the device frame of reference, the 3D coordinate based at least in part on the first distance, the first angle of rotation, and the second angle of rotation, the processor further configured to bring the object into focus and to determine a plurality of second 3D coordinates of the object in the device frame of reference, the plurality of second 3D coordinates based at least in part on the camera image, the first angle of rotation and the second angle of rotation.

10. A method for optically scanning and measuring an environment comprising:

providing a device having a first motor and a second motor that cooperate to direct a first beam of light to a first direction, the first direction determined by a first angle of rotation about a first axis and a second angle of rotation about a second axis, the device further having a first portion that rotates about the first axis, a second portion that rotates about the second axis and a third portion that is fixed relative to the movements about the first axis and the second axis, the device further having a distance meter arranged to receive a second light beam reflected by a remote target, the second light beam being a portion of the first light beam, the device having a device frame of reference;

providing a three-dimensional (3D) camera operably coupled to a periphery of one of the first portion, the second portion or the third portion, the 3D camera selected from the group consisting of a time-of-flight (TOF) camera and a light-field camera;

acquiring a camera image of an object with the 3D camera;

rotating the first portion with the first motor to the first angle of rotation and the second portion with the second motor to the second angle of rotation;

emitting the first beam of light and receiving the second light beam reflected off of the remote target;

determining a first distance to the remote target with the distance meter in response to receiving the second light beam;

determining at least one first 3D coordinate of the remote target in the device frame of reference, the at least one first 3D coordinates based at least in part on the first distance, the first angle of rotation and the second angle of rotation; and determining a plurality of second 3D coordinates of the object in the device frame of reference, the second 3D coordinates based at least in part on the camera image, the first angle of rotation and the second angle of rotation.

11. The method of claim 10 further comprising reflecting the first beam of light off of a retroreflector.

12. The method of claim 10 wherein the device further includes a rotating mirror.

13. The method of claim 12 further comprising reflecting the first beam of light off of the rotating mirror prior to the first beam of light striking the remote target and reflecting the second light beam off of the rotating mirror prior to being received by the distance meter.

14. The method of claim 10 wherein the 3D camera is positioned on a periphery of the first portion and the 3D camera has a field-of-view (FOV) of at least +/−20 degrees.

15. The method of claim 10 wherein the 3D camera is positioned on a periphery of the second portion and the camera has a FOV of at least +/−40 degrees.

16. The method of claim 10 wherein the 3D camera is positioned on a periphery of the third portion and the camera has a FOV of at least +/−60 degrees.

17. The method of claim 10 wherein the object in the camera image includes a plurality of surfaces, the plurality of surfaces including at least one surface.

18. The method of claim 17 wherein the at least one surface is at least a portion of an operator's body, the at least one surface including a first body part and a second body part.

19. The method of claim 18 further comprising:

providing a rule of correspondence between each of a plurality of commands and each of a plurality of gestures, each gesture from among the plurality of gestures including a spatial configuration of the first body part relative to the second body part, the rule of correspondence based at least in part on the spatial configuration;

performing a first gesture with the at least one surface from among the plurality of gestures prior to capturing the image, the first gesture corresponding to a first command;

determining the first command based at least in part on the image according to the rule of correspondence; and executing the first command with the device.

20. The method of claim 19 wherein the 3D camera has a field of view, wherein the remote target is within the field of view when the first gesture is performed.

* * * * *